United States Patent [19]

Reid et al.

[11] Patent Number: 4,710,690

[45] Date of Patent: Dec. 1, 1987

[54] CLOSED-LOOP CONTROL SYSTEM FOR A STEPPING MOTOR

[75] Inventors: Bruce A. Reid, Elmira; John R. M. Deline, Kitchener, both of Canada

[73] Assignee: NCR Corporation, Dayton, Ohio

[21] Appl. No.: 881,754

[22] Filed: Jul. 3, 1986

[51] Int. Cl.$^4$ ............................................. G05B 19/40
[52] U.S. Cl. .................................... 318/685; 318/696
[58] Field of Search ..................... 318/696, 685, 313

[56] References Cited

U.S. PATENT DOCUMENTS

| | | | |
|---|---|---|---|
| 3,359,474 | 12/1967 | Welch et al. | 318/138 |
| 3,374,410 | 3/1968 | Cronquist et al. | 318/138 |
| 3,439,200 | 4/1969 | Saito et al. | 310/49 |
| 3,766,458 | 10/1973 | Nishimura et al. | 318/313 |
| 4,156,170 | 5/1979 | Strunc | 318/696 |
| 4,158,800 | 6/1979 | Jahelka et al. | 318/685 |
| 4,536,691 | 8/1985 | Sakakibara | 318/696 |

OTHER PUBLICATIONS

"Digital Methods Fixes Phase Lag or Lead", D. W. Kennedy, Control Engineering, Aug. 1967, p. 72.
Giacomo, Paul, "A Stepping Motor Primer, Part 1: Theory of Operation", BYTE Publications Inc., Feb. 1979, pp. 90-105.

Primary Examiner—William M. Shoop, Jr.
Assistant Examiner—Saul M. Bergmann
Attorney, Agent, or Firm—Wilbert Hawk, Jr.; Albert L. Sessler, Jr.; Elmer Wargo

[57] ABSTRACT

A system and method for operating a stepping motor in start, run, and stop modes of operation. After the stepping motor is accelerated in the start mode, it is operated in the run mode by energizing the windings with a lead angle of two steps in one embodiment and by energizing the windings with a lead angle of two and one quarter steps in a second embodiment.

9 Claims, 22 Drawing Figures

| SEQ # | 1 | 2 | 3 | 4 | 1 | 2 | 3 |
|---|---|---|---|---|---|---|---|
| SENSOR-A | 1 | 0 | 0 | 1 | 1 | 0 | 0 |
| SENSOR-B | 1 | 1 | 0 | 0 | 1 | 1 | 0 |

| TABLE NUMBER | SEQUENCE NUMBERS | | | |
|---|---|---|---|---|
| | 3 | 2 | 1 | 4 |
| TABLE NO.1 (START) | 00 | 01 | 11 | 10 |
| TABLE NO.2 (RUN) | 00 | 01 | 11 | 10 |
| TABLE NO.3 (STOP) | 00 | 01 | 11 | 10 |

CLOSED-LOOP CONTROL SYSTEM FOR A STEPPING MOTOR

BACKGROUND OF THE INVENTION

This invention relates generally to a closed-loop, control system for a stepping motor, and in particular, it relates to such a system and method which enable the stepping motor to operate at high stepping speeds and at varying-torque loads.

In certain business equipment applications, it is necessary to move documents, intermittently, at high feeding rates. For example, in financial business machines, like an encoder or a proofing machine, it is necessary to feed documents, like checks, intermittently, from a stack of documents to a document track in the associated business machine. Because the documents to be processed are generally of varying sizes when received by a bank, these documents present varying-torque loads to a stepping motor which is used to intermittently feed the checks from the stack to the document track or to and away from a reading station which is located along the document track.

Some of the prior art control systems are not adept in maintaining the high stepping rates required for applications similar to the one described in the previous paragraph.

Summary of the Invention

This invention provides a control system for a stepping motor which is capable of rapid start/stop operation while handling varying-torque loads.

A preferred embodiment of this invention relates to a control system for a stepping motor which is operable in start, run, and stop modes of operation and which has windings and a rotor movable in rotation through a plurality of stable positions. The control system includes means for indicating the position of the rotor including first and second detectors having first and second outputs, respectively; and a controller means for receiving the first and second outputs of the first and second detectors and for energizing the windings in the start, run, and stop modes of operation. The controller means includes means for determining the stepping velocity of the rotor; and the controller means utilizes the first and second outputs of the first and second detectors to energize the windings with at least a two step lead angle in the run mode of operation when the stepping velocity reaches a predetermined rate.

An object of this invention was to provide a high-torque, direct drive for a document feeder, for example, which is capable of rapid start/stop operations.

Another object was to provide such a direct drive which could tolerate momentary loads beyond their torque ratings without stalling out and losing synchronization with their associated drive signals.

These objects and advantages will be more readily understood in connection with the following description, claims and drawing.

DETAILED DESCRIPTION OF THE INVENTION

Figure 3:
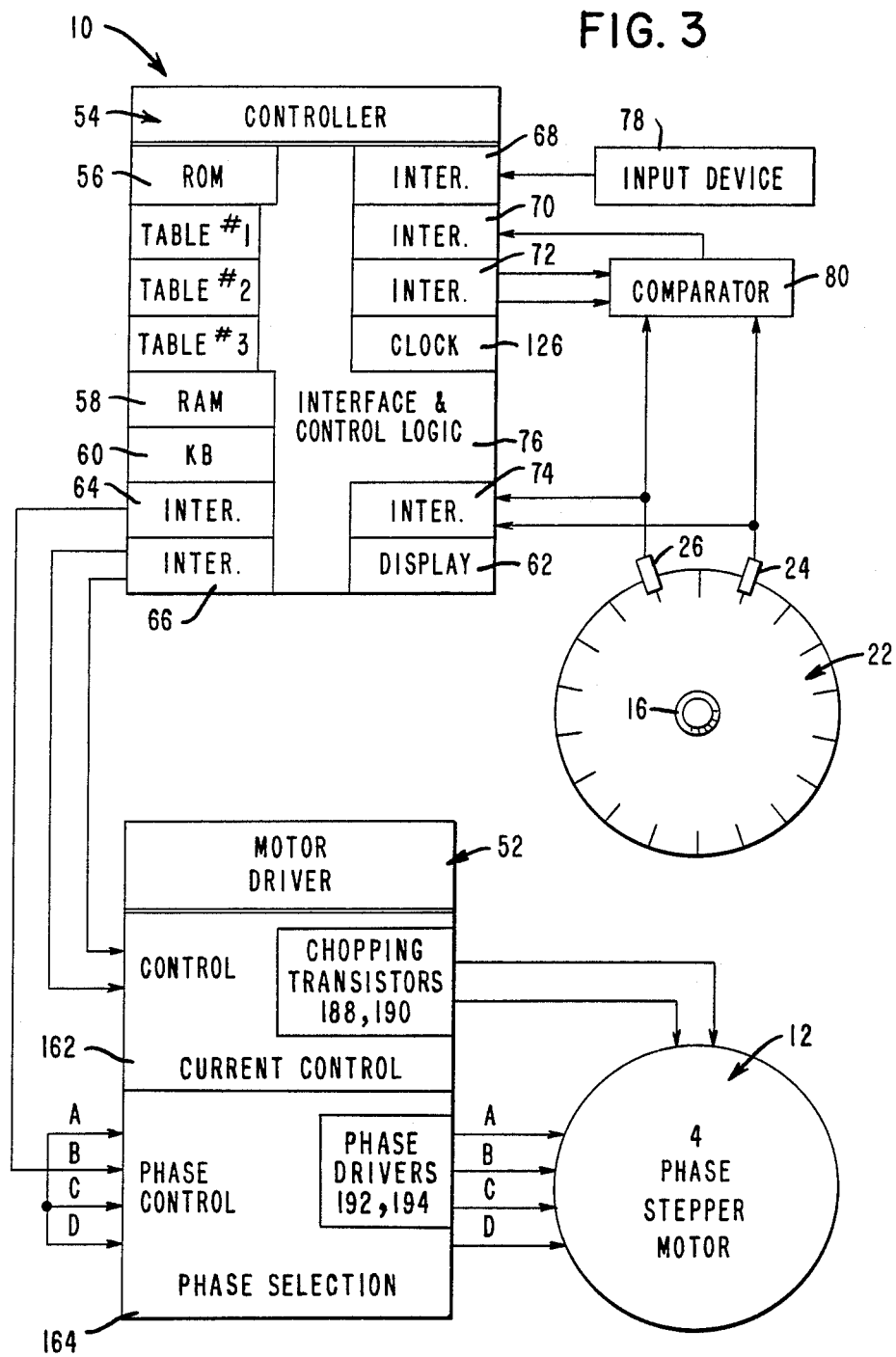
FIG. 3 is a schematic diagram, in block form, of this invention.

The control system 10 for controlling the operation of the stepping motor 12 is shown in FIG. 3; however, before discussing the control system 10, it appears useful to discuss, first, the stepping motor 12.

The stepping motor 12, itself, is a conventional stepping motor, which, in the embodiment being described, is a Model #103-770-11, which is manufactured by Sanyo Denki Company Limited, Japan although the control system 10 may be used with other stepping motors. A useful definition of a stepping motor is that it "is a motor possessing the ability to rotate in either direction as well as stop and start at various mechanical rotational positions, and whose shaft (rotor) moves in precise angular increments for each input excitation change or step." This definition, along with some other general useful information about stepping motors may be found in an article entitled, "A Stepping Motor Primer" by Paul Giacomo and published in the February 1979 issue of BYTE magazine on pages 90-105 thereof.

Figure 1:
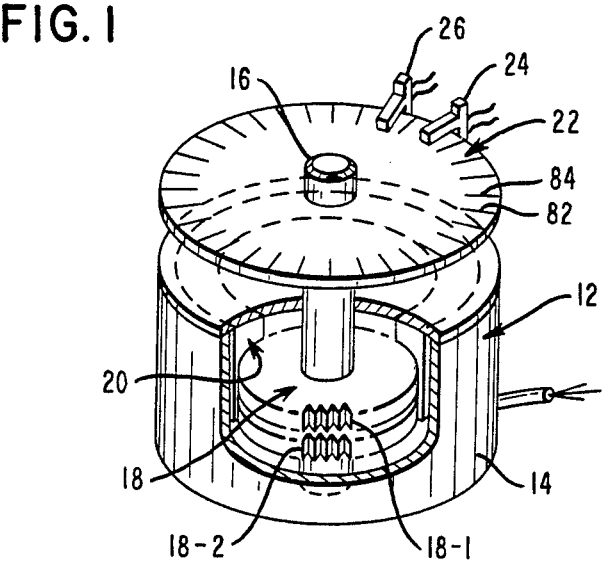
FIG. 1 is a general, schematic diagram, showing a stepping motor and a timing disc and sensors which are used in this invention.

The stepping motor 12 selected to portray this invention produces 200 steps per revolution with an incremental-shaft-angle-per-step of 1.8 degrees. Because the stepping motor 12 is conventional, it is shown only schematically in FIG. 1. In this regard, the motor 12 has a housing 14 in which the output shaft 16 is rotatably mounted and from which the output shaft 16 extends. The output shaft 16, for example, may be coupled to a driving wheel (not shown) to provide the rotational torque necessary to feed documents from a stack of documents as alluded to earlier herein. The rotor 18 is of the permanent magnet type with gear-like hubs 18-1 and 18-2 located on opposed ends thereof as shown in FIG. 1. The hub 18-1 has teeth (not shown) which are 180 degrees out of phase with teeth (not shown) on the hub 18-2. The stator shown generally as 20 in FIG. 1 has teeth (not shown) which cooperate with the teeth on the rotor 18 as will be described hereinafter. The number of teeth on the rotor 18 is different from that on the stator so that all the teeth on the rotor 18 will never be lined up exactly with those on the stator 20. This feature is what creates the predicted movement in the rotor 18. When current to the stepping motor 12 is switched off, the rotor 18 will assume a "detented" or stable position with regard to the stator 20 due to what is referred to as "residual torque" between the rotor 18 and the stator 20, ie., the magnetic attraction between the closest teeth of the rotor 18 and the stator 20. The stepping motor 12 has a timing disc 22 secured to the output shaft 16, and it also has sensors 24 and 26 which cooperate with slots in the timing disc 22 as will be described hereinafter.

Figure 2:
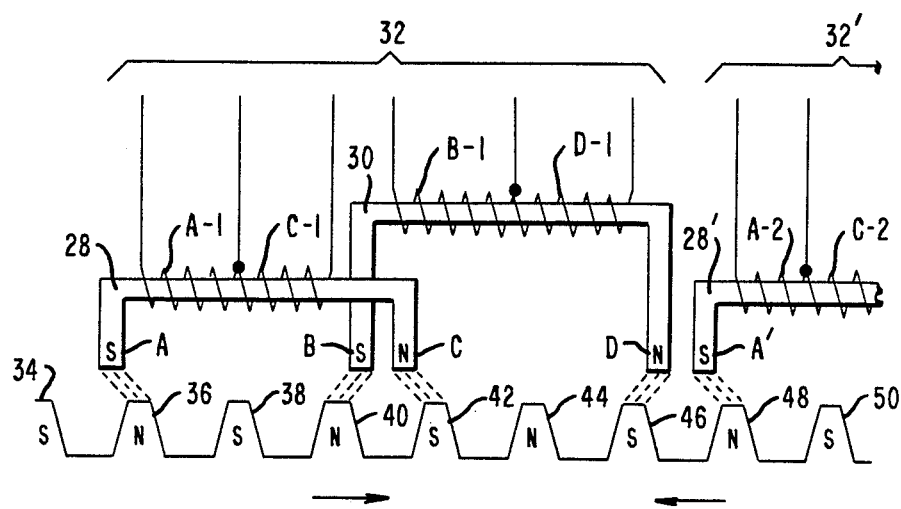
FIG. 2 is a general schematic diagram showing the relationship between stator poles and rotor poles of the stepping motor shown in FIG. 1.
Figure 2A:
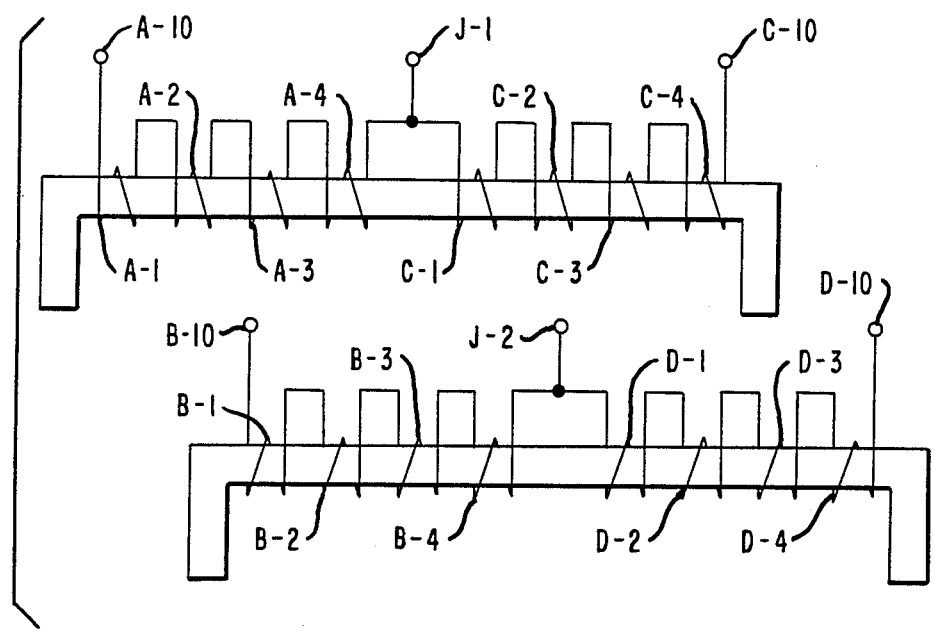
FIG. 2A is a schematic diagram showing how the various windings are interconnected.

Because the stepping motor 12 is conventional, it is sufficient to show only a schematic representation of the relationship between its rotor 18 and stator 20 as shown in FIG. 2. In the embodiment described, the poles A and C which are associated with core 28 represent a first set of poles, and the poles B and D which are associated with core 30 represent a second set of poles. The first and second sets of poles on cores 28 and 30, respectively, represent a group of poles which are designated by bracket 32. There are four groups of poles as shown by brackets 32 and 32′, however, the coils on core 28 and 28′ are connected together in series as shown in FIG. 2A, and similarly, the coils on cores 30 and 30′ (not shown but included in bracket 32′) are also series connected together. In reality there are only two unique pole sets ie., those represented by poles A and C and multiples thereof, and those represented by poles B and D and multiples thereof. However, there are actually eight separate poles in the stepping motor 12, and each of these separate poles has a serrated end with teeth or sub poles thereon to coact with the teeth on the rotor hubs 18-1 and 18-2. In the embodiment described, the rotor 18 has teeth or poles 34, 36, 38, 40, 42, 44, 46, 48, and 50, for example, and is indexed 1.8 degrees or 1/200th of a revolution for each energization of one of the windings or phases of the four coil windings in the motor 12.

The stepping motor 12 includes four basic stator windings which are designated generally as windings A-1, B-1, C-1, and D-1 as shown in FIG. 2; these are included in bracket 32. The stepping motor 12 also includes stator windings A-2, C-2, and B-2 and D-2 (not shown) which are included in bracket 32′ in FIG. 2. The stator windings A-1, A-2, A-3 and A-4 have energizing leads A-10 and J-1 as shown in FIG. 2A. The stator windings B-1, B-2, B-3 and B4 similarly have energizing leads B-10 and J-2. The stator windings C-1, C-2, C-3 and C-4 are similarly series-connected as shown in FIG. 2A and have energizing leads J-1 and C-10. And finally, the stator windings D-1, D-2, D-3 and D-4 have energizing leads J-2 and D-10.

The stepping motor 12 includes the basic stator windings A-1, B-1, C-1, and D-1 which are considered "phases" and which are energized in sequence to cause the rotor 18 to turn in one direction. For convenience, the various stator windings like A-1, B-1, etc. will be considered as phase A, phase B, etc. when considering them from an energizing standpoint. For example, if phase A is energized and phase B is next energized, the rotor 18 will rotate in one direction for 1.8 degrees or 1/200th of a revolution in the embodiment described. If phase B is energized and then phase A is energized, the rotor will rotate in the opposite direction (in the example being described) for 1.8 degrees or 1/200th of a revolution.

The stepping motor 12 used in the embodiment described is a 5.1 volt, 1 amp. rated motor which is driven by a 28 V current regulated motor driver 52 shown in FIG. 3. Overdriving a 5.1 V motor with a 28 V driver decreases the current rise time and also overcomes the opposing EMF generated in the windings of the motor 12 due to the interaction between the permanent magnet rotor 18 and the windings of the motor 12. Both of these factors become increasingly important as the speed of the motor 12 increases, as will be explained hereinafter.

Before discussing the operation of the stepping motor 12, it is useful to explain the control system 10 shown in FIG. 3. In this regard, the control system 10 includes a controller which is designated generally as 54. The controller 54 is conventional and includes a read only memory (ROM) 56, a random access memory (RAM) 58, a keyboard (KB) 60, a display 62, interfaces 64, 66, 68, 70, 72, and 74, and interface and control logic 76 which interconnects the various elements shown to enable the controller 54 to function as an intelligent terminal. The actual form of the controller 54 may be different from that shown in FIG. 3; however, the controller 54 is shown to illustrate the various functional relationships among the various components shown in FIG. 3.

The control system 10 (FIG. 3) may also include an input device 78 whose output is fed through the interface 68 to the controller 54. The input device 78 may be a tape or disc player for loading programs into the RAM 58 of the controller 54, for example, or it may be another computer system including a host controller which broadly controls the operation of the controller 54. The control system 10 also includes a comparator 80 which receives the outputs from the sensors 24 and 26 for a purpose to be described hereinafter. The ROM 56 has several look-up tables therein which are referenced as Table #1, Table #2, and Table #3; the functions of these tables will be described hereinafter.

Figures 4, 5, 5A:
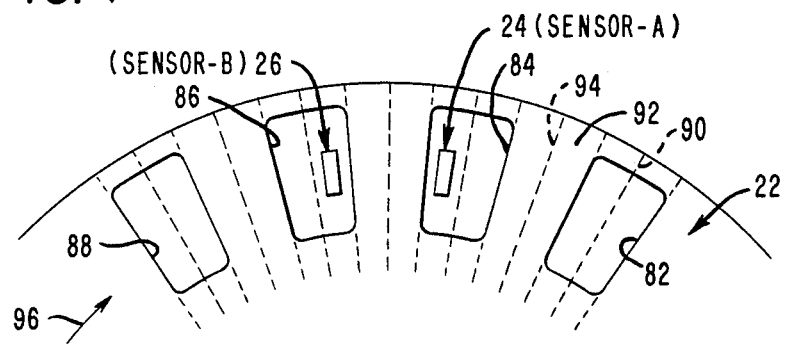
FIG. 4 is a schematic diagram showing an enlarged view of the timing disc shown in FIG. 1.
FIG. 5 is a chart showing the status of sensors used to denote various rotor positions.
FIG. 5A is a chart showing various sensor states and associated sequence numbers associated with "start", "stop", and "run" modes of operation of the stepping motor.

The control system 10 also includes the timing disc 22 alluded to earlier herein and shown in enlarged, schematic form in FIG. 4. The coaction between the disc 22 and the sensors 24 and 26 produces positional relationships to be explained hereinafter. For ease of explanation, sensor 24 will be referred to, also, as sensor A. Similarly, sensor 26 will be referred to, also, as sensor B.

The disc 22 has a plurality of radially-aligned slots like 82, 84, 86, 88 which coact with the sensors A and B as shown in FIG. 4. The slots, like 82 and 84, are of equal size and are equally spaced apart with each slot being equivalent to two step positions (in the embodiment described) as shown by the dashed line 90, and similarly, the disc portion 92 between two adjacent slots 82 and 84 is equivalent to two step positions as shown by the dashed line 94. In the embodiment described, there are 50 such slots like 82 and 84, for example, and 50 solid disc portions, like 92, between adjacent slots 82 and 84.

FIG. 5 is a chart showing the states of the sensors A and B shown in FIG. 4 for various rotor positions. For example, in the rotor position shown in FIG. 4, both the sensors A and B are aligned in the slots 84 and 86, respectively; consequently, the outputs of these sensors will be active or a binary "1" as shown for sequence #1 in FIG. 5. As the rotor 18 and disc 22 are stepped in the direction of arrow 96 for one position, sensor A becomes blocked or inactive or a binary zero while sensor B remains active as shown for sequence #2 in FIG. 5. After sequence #4, the states of sensors A and B repeat themselves as shown for the second sequence #1 which is located to the right of line 98 in FIG. 5. When the rotor 18 rotates in a direction which is opposite to arrow 96 (FIG. 4), the sequence numbers are reversed from those shown in FIG. 5; for example, the sequence numbers would be 1-4-3-2-1-4, etc.

Figure 6:
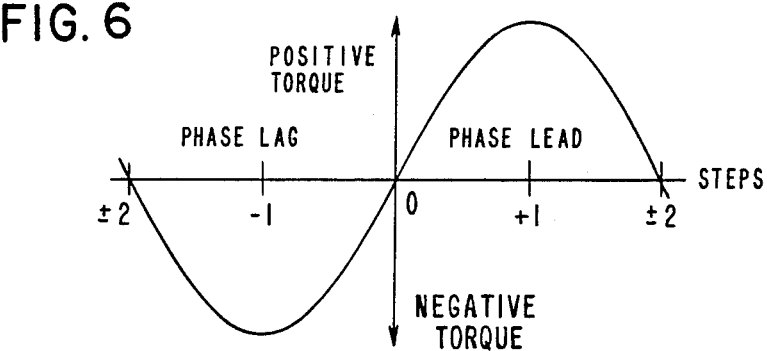
FIG. 6 is a graph showing the relationship between the phase lead angle and the actual position of the rotor of the stepping motor.

Before discussing the operation of the control system 10, it also appears useful to discuss certain operating parameters of the stepping motor 12. In this regard, FIG. 6 shows the relationship between torque (both positive and negative) and the energized phases of the stator 20. As shown in FIG. 6, the ideal performance (maximum torque) is achieved when the energized phase is one step or phase away from the actual position of rotor 18. Due to the phases of the motor 12 and the feedback from the timing disc 22 not being continuous, it is not possible to maintain a lead angle which is exactly one step ahead of the position of the rotor 18. With the feedback system associated with timing disc 22, it is possible to maintain a lead angle which varies from 0.5 step to 1.5 steps ahead of the actual position of rotor 18, thereby providing an average lead angle of one step; this produces a torque which causes the rotor 18 to move toward the energized phase. As the rotor 18 approaches, the torque increases until the lead angle is one step, and thereafter, the torque decreases until the lead angle is 0.5 step. At this point, the feedback from the timing disc 22 changes, causing the next phase to be energized; this causes the lead angle to be 1.5 steps, and the cycle just described is repeated.

To produce maximum torque, the stepping motor 12 can be driven with two adjacent phases being energized at all times; this produces a "phantom pole" position half way between the actual poles of the rotor 18. The phase names become AB, BC, CD, and DA; this means that phase windings AB are energized together; phase windings BC are energized together, etc. When adjacent phases are energized, the positions are offset by ½ step; for example, position AB is ½ step advanced from position A; this is called a "two phase" drive system.

Figure 7:
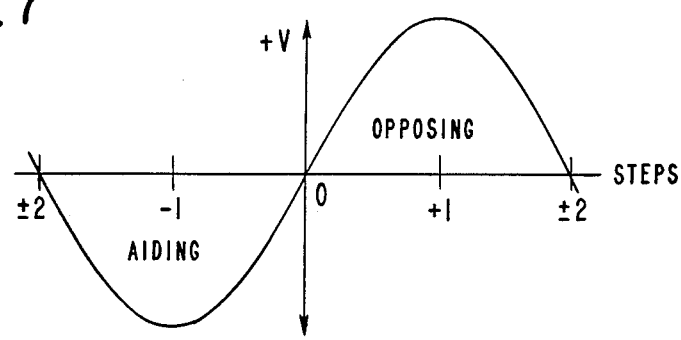
FIG. 7 is a graph showing the self-generated voltage in any of the phase windings of the stepping motor relative to its associated rotor position.

The systems described in the two preceding paragraphs operate well at speeds up to 1500 steps/second; however, they do not operate well in environments where 2400 steps/second are required. At the higher speed mentioned, there are two factors which require attention. The first is that the inductance of the stepping motor 12 causes a delay in the application of current to a winding or phase. Secondly, because the rotor 18 is a permanent magnet, it generates a sinusoidal voltage or back E.M.F. in each phase winding as the rotor 18 turns. The voltage generated is shown in FIG. 7. In this regard, the maximum E.M.F. or opposing voltage occurs at a lead angle of one step.

Notice from FIG. 7 that at ±2 steps the opposing E.M.F. is zero; however, from FIG. 6 the torque is zero at ±2 steps. For the stepping motor 12 utilized, the peak E.M.F. generated actually exceeded the 28 volts which was used to drive it; this means that the motor driver, like 52, cannot cause the current in the phase to increase when the lead angle is in the range of one step and when the motor speed is over 1500 steps/second.

Figure 8:
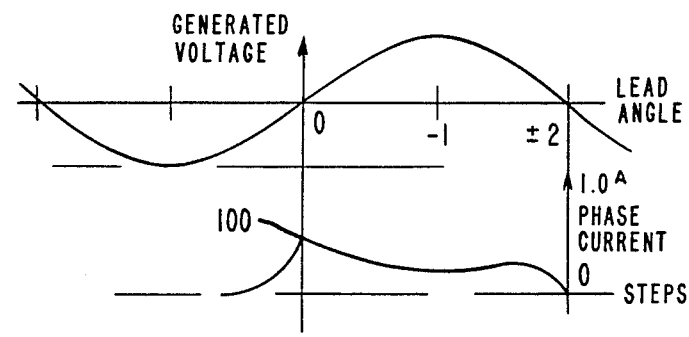
FIG. 8 is a graph showing back E.M.F. or generated voltage and energizing current when the motor shown in FIG. 1 is operated by energizing each phase at a two-step lead angle.

These problems are overcome in the control system 10 by energizing each phase at a two-step lead angle in one embodiment and de-energizing it at a one step lead angle. In this regard, FIG. 8 shows the energizing or phase current and the back E.M.F. or generated voltage (when the stepping motor 12 is rotating at 2400 steps/second) due to permanent magnet rotor 18 reacting with the stator 20, with the steps being shown as the "x" coordinate. Notice that energizing current rises (as at point 100) before the generated voltage reaches its peak. While the two-step lead angle works well at stepping speeds of 2400 steps/second, it produces little or no starting torque; this is because, in a static condition, a phase angle lead of two steps produces no torque as seen from FIG. 6.

In the control system 10, the stepping motor 12 is started with a phase lead angle of one step with one phase on, and when the stepping motor 12 has reached a certain stepping speed of about 1500 steps/second in the embodiment described, the phase lead angle is switched to two steps with two phases on.

Having described, generally, the various components in the control system 10, it now seems appropriate to discuss the method of operation of system 10. The various steps involved in the operation of the system 10 start with the start operation in FIG. 9A. The controller 54 is initialized at step 102 shown as block 102; this initializing includes the usual housekeeping functions. When the stepping motor 12 is to be operated, a Run command is given. This Run command may be generated internally by a program stored in ROM 56, for example, or the Run command may be initiated by a host controller which may function as an input device 78 (FIG. 3) to the controller 54. The sequence of steps or program for controlling the operation of the control system 10 is stored in the ROM 56, and the program is designated generally as 104 in FIG. 9A.

After the initialized step 102 (FIG. 9A), the program 104 checks at step 106 (represented by the action block 106) as to whether or not a Run command has been received. The program 104 cycles in a small loop at step 106 until a Run command is received.

When a Run command is received at step 106 (FIG. 9A), the program 104 performs several functions at step 108 (represented by block 108). The functions performed at step 108 are as follows:

1. Set mode equal to start;
2. Output starting phase pattern; and
3. Enable interrupts.

With regard to the function #1, a mode is actually a number which is used to designate a particular state of the stepping motor 12 in the embodiment described. For example, a start-up mode is represented by a first number which is placed within a particular location in the RAM 58 of the controller 54. Whenever an interrupt occurs (from sensors 24 and 24), an interrupt routine designated generally as 110 (FIG. 10) is utilized. One of the functions of the interrupt service routine 110 is to determine in which mode the stepping motor 12 is operating. When the mode of operation of the stepping motor 12 is known, the appropriate phase pattern is selected to energize the stator 20 in the appropriate way for that mode of operation.

Figure 9A:
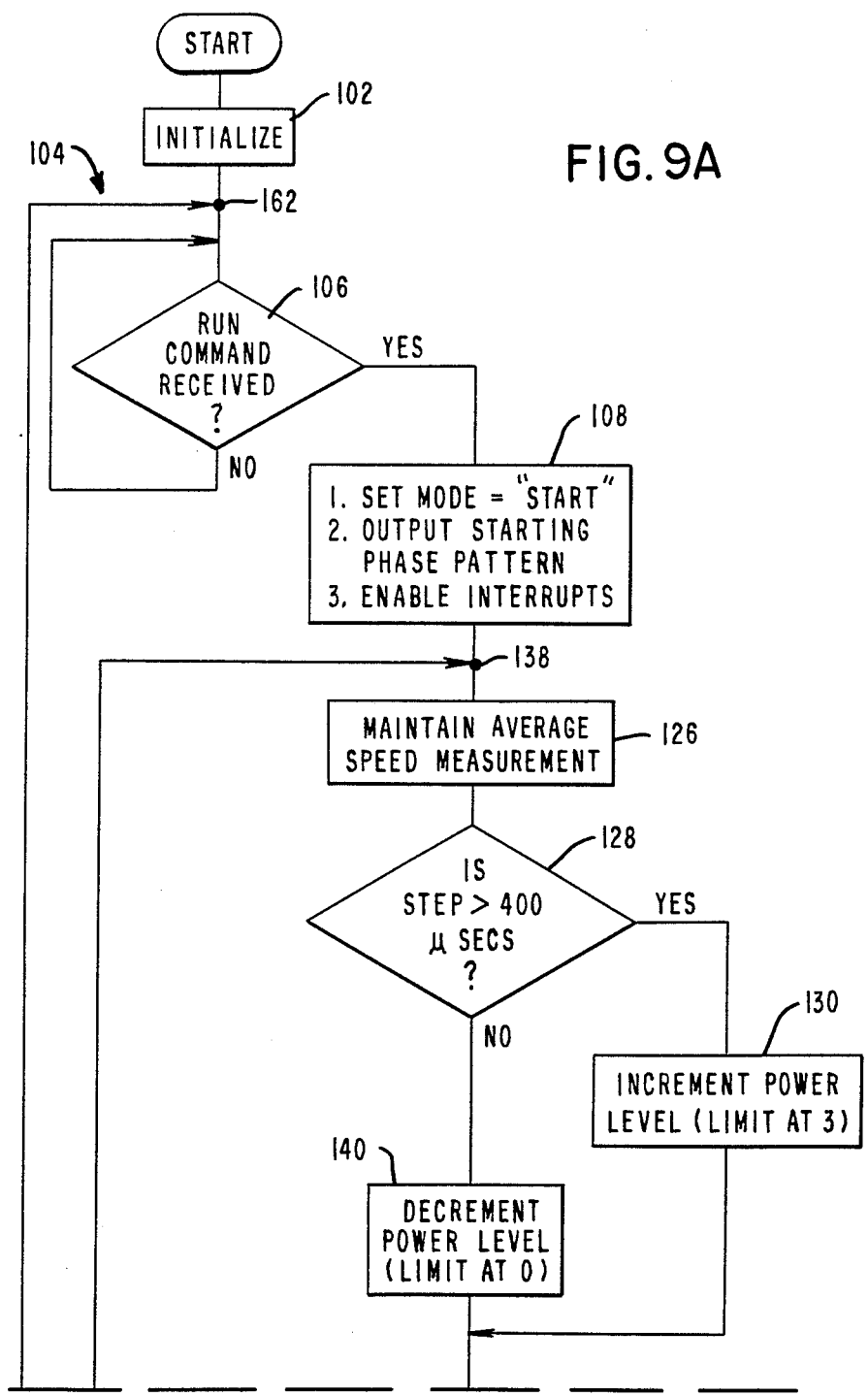
FIGS. 9A and 9B taken together show the various steps in a program for controlling the operation of the stepping motor shown in FIG. 1.

After the mode of operation of stepping motor 12 is set to "Start" as discussed in relation to step 108 in FIG. 9A, the next or second function is to output the starting pattern. The stepping motor 12 is at rest at this time, and a conventional phase pattern is needed to get it started. In this regard, a look-up Table #1 in ROM 56 is used to obtain a "1 phase plus a 1 step lead" data to be outputted from the controller 54 via interface 64 to the motor driver 52 (FIG. 3). The appropriate output is sent from interface 66 of the controller 54 to the motor driver 52 to control the current supplied to the stepping motor 12.

After the starting phase pattern is outputted at step 108 in FIG. 9A, the interrupts are enabled. These interrupts are derived from sensor state changes in the sensors 24 and 26 (FIG. 3) as the rotor 18 turns as previously described.

An interrupt, coming from the output of comparator 80 as previously described, is fed through interface 70 to the controller 54, with the interrupt being shown as step 112 (FIG. 10) in routine 110. The next step 114 in routine 110 is to read the sensor inputs and output these bits (step 118) via interface 72 to the comparator 80. This readies the comparator 80 to detect the next change of state of the sensors 24 and 26. Thereafter, the routine 110 proceeds to step 120 where the routine 110 tests the mode of operation, which in the example being discussed is the "Start" operation as set from step 108 in FIG. 9A. In this instance, the mode of operation is equal to "Start"; therefore, the routine 110 proceeds to step 122 in FIG. 10. From step 122, the routine 110 obtains the data from look-up Table #1 and outputs the data corresponding to "1 phase plus 1 step lead" to the motor driver 52, and thereafter, the routine 110 proceeds to step 124. The controller 54 has a running clock 126 which is used to obtain the time since the last interrupt from comparator 80. At step 124, "restart timer" is used to obtain the elapsed time from the last interrupt. From step 124, the routine 110 is ended, and control is transferred to the program 104 shown in FIGS. 9A and 9B.

The elapsed time obtained from the interrupt service routine 110 at step 124 (FIG. 10) is used by the program 104 in step 126 (FIG. 9A) to maintain an average speed measurement. In the embodiment described, the average speed measurement is described as 400 microseconds. In other words, until the elapsed time from step 124 is less than 400 microseconds, it means that the speed of the stepping motor 12 is less than desired. Notice also that so far, only one cycle through the interrupt service routine 110 has been described; however, several such cycles are required before the stepping motor 12 is brought up to speed. As part of the operation of bringing the stepping motor 12 up to speed, the program 104 (at step 128) determines whether or not the elapsed time from the last interrupt (or last step) is greater than 400 microseconds. If it is greater, it means that the stepping motor 12 needs accelerating to get it up to speed, and at step 130, the power level to the stepping motor 12 is increased. The increases start at a multiple of one, then two for the second accelerating cycle, with three being the upper limit for subsequent accelerating cycles. If the step time is not less than one millisecond at step 132 in FIG. 9B, it means that more acceleration is necessary to get the motor 12 "up to speed." However, before going into another acceleration cycle, the program 104 inquires at step 136 as to whether or not a "Stop" command has been received. If no "Stop" command has been received, the program 104 returns to point 138 to repeat the accelerating cycle just described.

On the next cycle beginning at step 126 in FIG. 9A, the elapsed time for a step of travel for stepping motor 12 may be less than 400 microseconds at step 128. If this is so, it means that the stepping motor 12 is travelling faster than normal, and, accordingly the speed thereof must be reduced. At step 140 (FIG. 9A) the power level control (going to the motor driver 52 in FIG. 3) will be decremented by one from whatever value was set at step 130 from the prior cycle; in this case it was a prior accelerating cycle. Steps 132 and 136 are repeated. In the embodiment described, the average speed measurement determined at step 126 is based on up to the last four cycles.

If at step 132 in FIG. 9A, the stepping time is less than one millisecond, it means that the stepping motor 12 has been accelerated to a normal stepping rate (in the embodiment described), and consequently, the stepping motor can be switched from an accelerating or "Start" mode to a "Run" mode at step 142. As the loads change on the stepping motor 12, power to the motor 12 may have to be increased or decreased. Consequently, as long as the stepping motor 12 is in the "Start" or "Run" modes, it will remain loop represented by steps 126 through 136 in FIGS. 9A; and B only way out of this loop is through a "Stop" command which occurs at step 136. The stop command may come from a host controller shown as input device 78 (FIG. 3); however, the most likely source for the Stop command is the controller 54 itself. The controller 54 is able to perform other functions in addition to controlling the operation of stepping motor 12; however, these functions are not described or shown in the drawing so as to simplify the explanation of this invention.

When the "Run" mode of operation was set (step 142 in FIG. 9B) as described in the previous paragraph, an address is utilized to reach Table #2 in the ROM 56 (FIG. 3). Table #2 has data in it which represent the phase control inputs A,B,C, and D to motor driver 52 to enable it to operate in the "Run" mode, i.e.; with a two step lead with two phases on as discussed earlier herein.

When the stepping motor 12 is in the Run mode, the following takes place when an interrupt (derived from the timing disc 22 and sensors 24 and 26) occurs. When step 120 (FIG. 10) in the interrupt routine 110 is reached, the routine proceeds to step 144 because the mode of operation under discussion is not "Start" but "Run." From step 144, the routine 110 proceeds to step 146 where the phase pattern is looked up (Table #2) and the phase pattern "two phase plus two step lead" is outputted to the motor driver 52 to continue the "Run" mode of operation. From step 146, the routine 110 proceeds to step 124 where the elapsed time for the last step of the stepping motor 12 is obtained. Thereafter, control shifts to point 138 in FIG. 9A of the program 104 to check on the velocity of the stepping motor 12 as previously described. The "two phase plus two step lead"

output from Table #2 means that phases AB are energized together, then phases BC, CD, and DA to complete a cycle when rotating in one direction. The "two step lead" relates to the energizing as described in relation to FIG. 8. The stepping motor 12 will continue in this operating mode of utilizing the program 104 in FIG. 9A for monitoring the speed of the motor 12 and of utilizing the interrupt service routine 110 in FIG. 10 to issue the appropriate phase and lead outputs in response to the outputs of sensors A and B as shown in FIG. 5 until a "Stop" command is received.

Before discussing the "Stop" command, it appears appropriate to discuss the relationship between the outputs of the sensors A and B (FIG. 5) and the Table #1, Table #2, and Table #3 which are part of the ROM 56. The Tables #1, #2, and #3 may take the form of the chart shown in FIG. 5A, with the Tables #1, #2, and #3 being shown as horizontal entries and with the sequence numbers being shown in columns. Notice, for example, that the sensors A and B for sequence #3 in FIG. 5 are 0 and 0, respectively, and these values 00 are shown under sequence #3 in FIG. 5A for each oi the Tables #1, #2, and #3. From a particular Table # and Sequence Number (FIG. 5A), the appropriate energizing pattern is obtained and outputted to the motor driver 52 as previously explained. In other words, the mode of operation (Start, Run, or Stop) is used to select the appropriate Table #1, #2 or #3, respectively, and the appropriate sequence numbers are obtained from the states of sensors A and B associated with the timing disc 22.

Figure 9B:
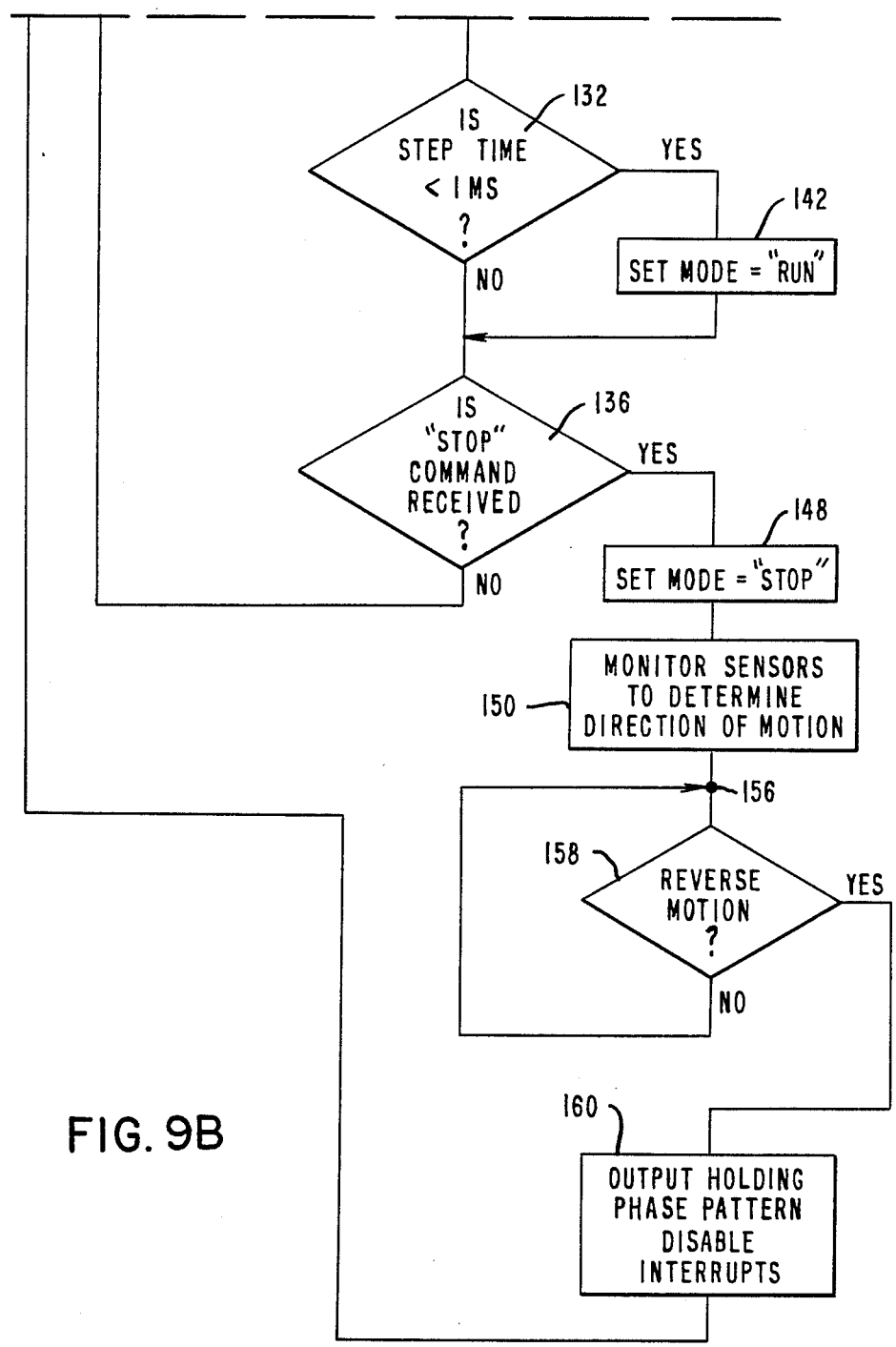

Continuing with the "Stop" mode of operation alluded to earlier herein, when a stop command is received at step 136 in the program 104 in FIG. 9B, the program 104 sets the mode of operation to "Stop" as indicated by step 148. In order to stop the stepping motor 12 very quickly, it is necessary to apply a negative torque thereto. This negative torque is effected by supplying a negative lead angle to motor 12, and thereafter, the program 104 at step 150 (FIG. 9B) monitors the sensors A and B to determine the direction of motion of the timing disc 22. It should be recalled from the discussion made earlier herein that when the rotor 18 rotates in one direction, like that shown by arrow 96 in FIG. 4, the states of the sensors A and B change in a definite sequence as shown in FIG. 5. When the rotor 18 rotates in an opposite direction from that shown in FIG. 4, notice that sensor B becomes blocked or "zero" before sensor A becomes blocked, thereby indicating a rotation which is opposite to that shown in FIG. 5.

Figure 10:
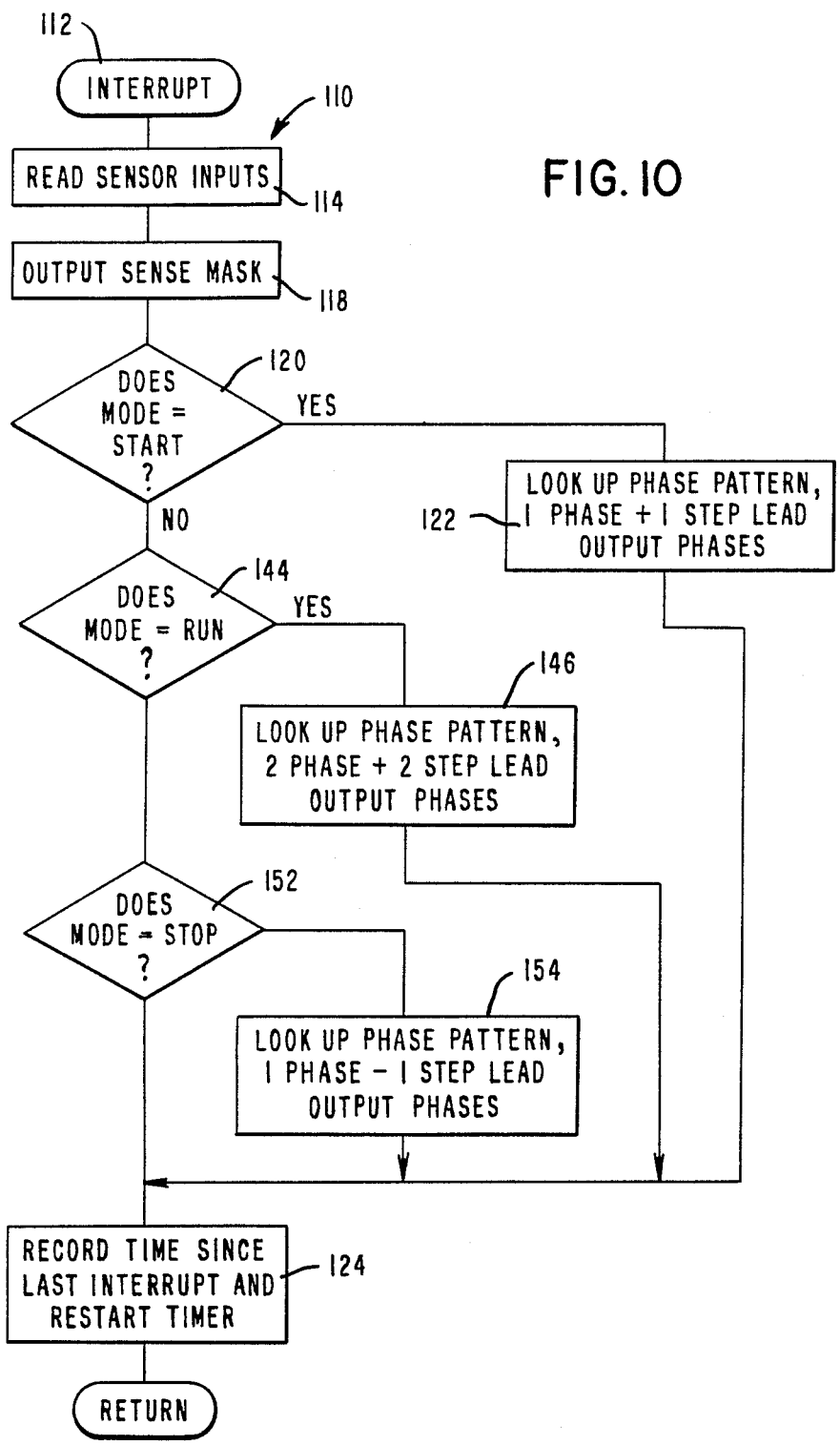
FIG. 10 shows an interrupt service routine which is associated with the program shown in FIGS. 9A and 9B.

After the stepping motor 12 is put into the "Stop" mode as discussed in step 148 in FIG. 9B, when an interrupt occurs, the interrupt service routine 110 proceeds to step 152 in FIG. 10. Because the Stop mode of operation is in effect, the routine 110 proceeds to step 154 from which the "one phase minus one step lead" mode of operation is outputted to the motor driver 52 as previously described. Thereafter, control returns to program 104 at point 156 (FIG. 9B) therein. From this point 156, the program 104 determines, at step 158, whether or not reverse motion has occurred. In other words, from step 150, the controller 54 knows the direction of rotation, and as soon as reverse motion is detected from the states of sensors A and B, it means that the rotor 18 has reversed direction. When this occurs, the routine 110 proceeds to step 160 where a phase pattern which is opposite to that which produced the reverse motion is supplied to the motor driver 52 to stop the rotor 18. From step 160 in FIG. 9B, the program 104 proceeds to point 162 in FIG. 9A where the program loops until it receives a "Run" command to repeat the process described.

Figure 11:
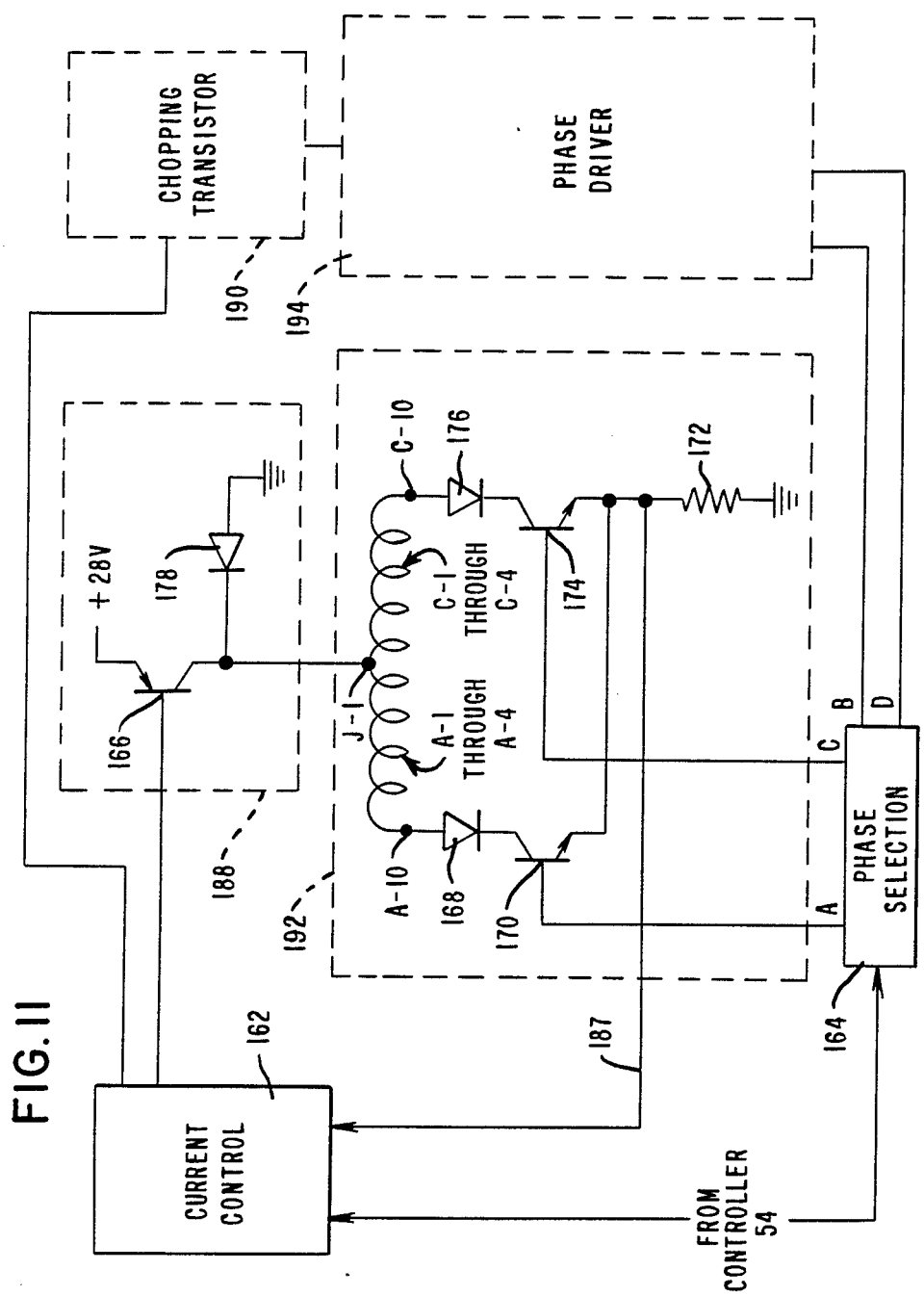
FIG. 11 is a schematic diagram showing more details of the driver shown in FIG. 3.

The motor driver 52 (FIG. 3) alluded to earlier herein is shown in more detail in FIG. 11. The driver 52 includes the current control section 162 and the phase selection section 164. In the embodiment described, the current control section 162 includes a 20 KHz oscillator (not shown) whose output is fed into the base of a chopping transistor 166 whose emitter is connected to a source of potential of +28 volts.

Figure 12:
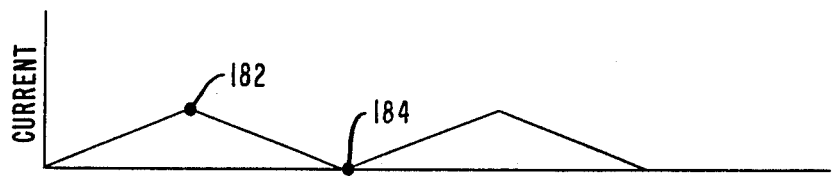
FIG. 12 a wave form showing current passing through the stator or windings of the stepping motor.
Figure 13:
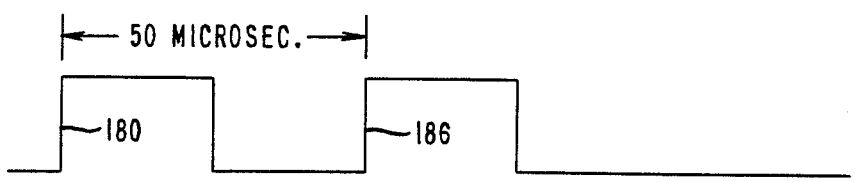
FIG. 13 is a wave form of a switching transistor used in the motor driver shown in FIG. 3.

The collector of the transistor 166 is connected to the junction J-1 (shown also in FIG. 2A) between the A-1 through A-4 stator windings and the C-1 through C-4 stator windings. The conductor A-10, coming from the stator windings A-1 through A-4, is connected to a diode 168 whose output is coupled to the collector of a phase selection transistor 170. The emitter of the transistor 170 is coupled to ground via a one-ohm resistor 172. When phase A is selected by the phase control section 164, transistor 170 is turned on (for a period of 800 microseconds in the embodiment described) causing current to flow through the stator windings A-1 through A-4. When phase C is selected by the phase control section 164, transistor 174 is turned on (for a similar period of 800 microseconds) causing current to flow through the stator windings C-1 through C-4 and the diode 176. The transistors 170 and 174 are alternately "on" and "off"; however, only one of the two transistors is on at any one time. After the current passes through the phase selection transistor 170, for example, and passes to ground through the resistor 172, the residual current which is stored in the stator winding (A-1 through A-4) passes from ground up through the diode 178 and returns to the junction J-1. This action occurs during the time that the chopping transistor 166 is turned off. For example, FIG. 13 shows the wave forms resulting from the chopper or switching functions performed by transistor 166. FIG. 12 shows the amount of current passing through a stator winding, like A-1 for example, with respect to time. Notice that when the switching transistor 166 (FIG. 11) is turned on at line 180 (FIG. 13), the current passing through the stator windings A-1 through A-4 (assuming phase A is selected) will rise to point 182 in FIG. 12. Thereafter, the residual current which was stored in the stator windings (A-1 through A-4) will fall from point 182 to point 184 (due to current decay) where the switching transistor 166 is turned on again, as at line 186. In other words, the switching transistor 166 (FIG. 11) switches state for about 16 cycles (with a nominal clock rate of 50 microseconds) for each duration of a phase, like A, which has a duration of 800 microseconds in the embodiment described. The duration of phases A, B, C, and D (FIG. 14) are identical from a time standpoint and are controlled by the phase selection section 164. The clocking or switching rate for transistor 166 is nominally 50 microseconds. It is a nominal rate because the "on" cycle of the switching transistor 166 can be varied by increasing the "on" time when the current passing the stator windings, like A-1 for example, is less than desired. In this regard, the current control section 162 (FIG. 11) includes a voltage comparator (not shown) which compares the voltage across resistor 172 (via conductor 187) with a reference voltage and uses the difference to conventionally modulate the length of the "on" cycle of the switching transistor 166.

Figure 14:
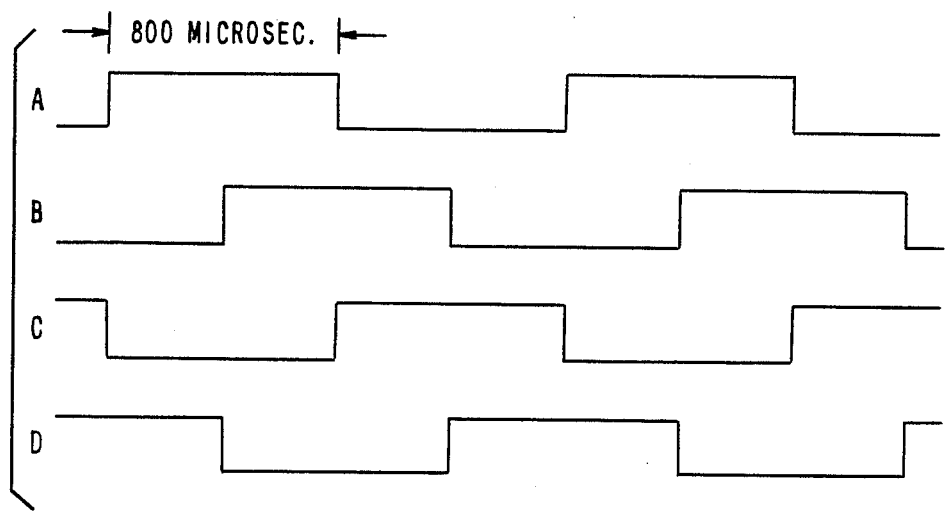
FIGS. 14A, 14B, 14C, and 14D are wave forms representing phase relationships associated with the stepping motor shown in FIG. 1.

When phase C is selected by the phase selection section 164, the transistor 174 is turned on, and correspondingly, current travels, through the stator windings C-1 through C-4 as are just described in relation to the stator winding A-1 through A-4. Note that the circuitry which is shown in dashed rectangle 188 is duplicated for the stator windings B-1 through B-4 and D-1 through D-4 and is referred to as "chopping transistor" and shown as dashed rectangle 90. Correspondingly, that circuitry which is shown in dashed rectangle 192 is duplicated for the stator windings B-1 through B-4 and D-1 through D-4; is referred to as "phase driver"; and is shown as dashed rectangle 194. Notice also from FIGS. 14A and 14C that the phases A and C are opposite to each other, i.e., when phase A is on, phase C is off. Notice also that phases B and D are displaced from a time standpoint with regard to phase A and C as shown in FIGS. 14B and 14D. Phase B is displaced from phase A by 400 microseconds, and similarly, phase D is displaced from phase C by 400 microseconds. The duration of each of the phases A, B, C and D is 800 microsecodns in the embodiment described. Note that FIGS. 13 and 14 are not drawn to the same time scale.

Figure 15:
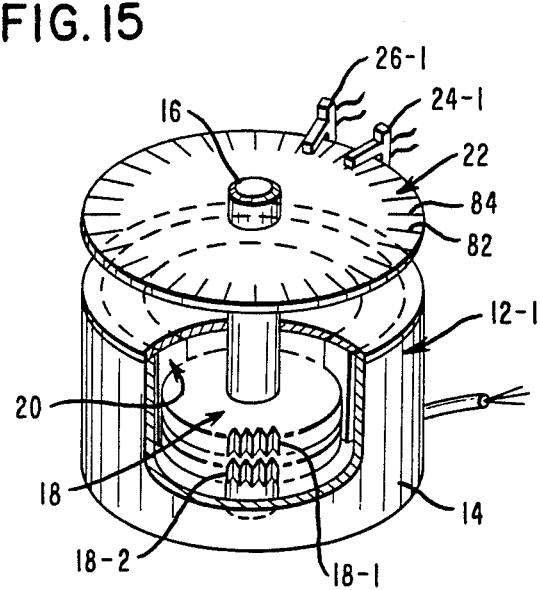
FIG. 15 is a diagrammatic showing of a second embodiment of this invention.

To summarize, the stepping motor 12 described in relation to FIGS. 6–8, in particular, relates to one which employs a two-step lead angle as already described. Another embodiment of the stepping motor, which is designated as 12-1 and shown in FIG. 15, is generally similar to stepping motor 12 already described; however, the stepping motor 12-1 employs a lead angle which is two and one-quarter steps instead of the two-step lead angle for stepping motor 12. The stepping motor 12-1 is identical to stepping motor 12 except for the positioning of sensors associated with disc 22. Accordingly, the sensors associated with disc 22 of motor 12-1 are designated 24-1 and 26-1 in FIG. 15 because they are displaced slightly differently from the corresponding sensors 24 and 26. The remaining elements of the stepping motor 12-1 are identical to the corresponding elements in stepping motor 12, and consequently, these identical elements are assigned the same numbers as are the corresponding elements in stepping motor 12.

The sensors 24-1 and 26-1 (FIG. 15) are displaced slightly from the positions shown in FIG. 4 for sensor A (24) and for sensor B (26) already discussed. In this regard, the sensors A (24-1) and B (26-1) for stepping motor 12-1 are advanced slightly so that a change of state occurs between a pole and the following pole pair. This aspect is more readily understood in connection with the chart shown in FIG. 16.

Figure 16:
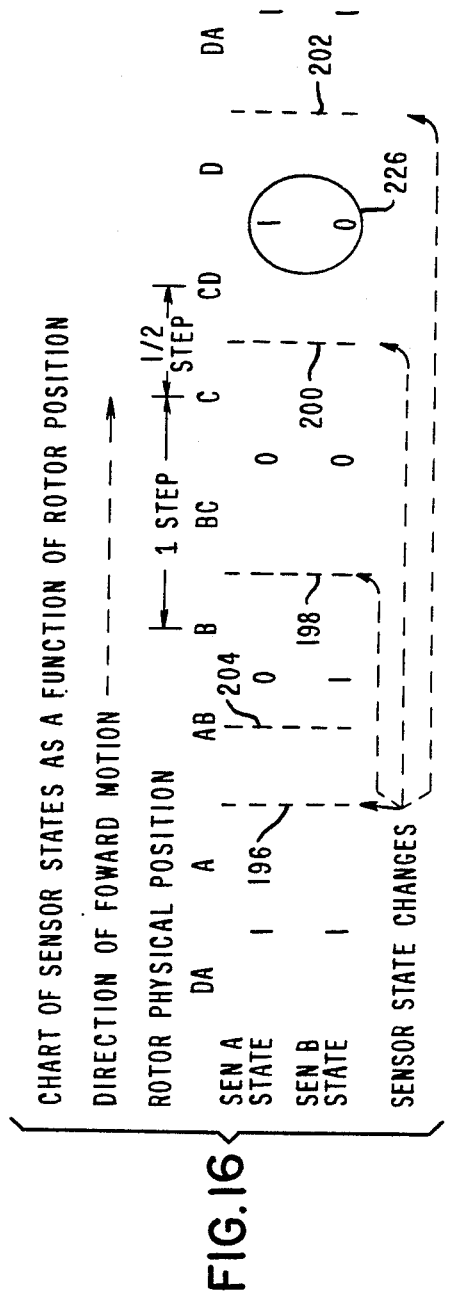
FIG. 16 is a chart showing sensor states as a function of the position of the rotor in FIG. 15;.

FIG. 16 is a chart which shows various sensor states (A and B) as a function of the position of rotor 18 of the motor 12-1. The states of sensors A and B (24-1 and 26-1) are shown as a binary "one" which means "on" or shown as a binary "zero" which means "off." The sensor states of sensors A and B are shown as changing at the transition points marked by dashed lines 196, 198, 200, and 202. As stated in the previous paragraph, the sensors (A and B) are advanced so that a change of state (like that represented by line 196) occurs between a pole (like pole A) and the following pole pair (like AB). In contrast, the change of state of the sensors (A and B) associated with the motor 12 occurs between the rotor positions A and B, for example, as shown by dashed line 204 in FIG. 16. Notice that from rotor position B to rotor position C in FIG. 16, there is one step. Notice also that from a rotor position like C to a position like CD, there is one-half step as shown in FIG. 16. Correspondingly, between rotor position A and rotor position AB there is one-half step; therefore, with the transitions occurring half way between rotor position A and rotor position AB (as at dashed line 196 in FIG. 16), there is a one-quarter step advance compared to the first embodiment or motor 12. In stepping motor 12-1, the total advance is two and one-quarter steps.

Figures 18, 19:
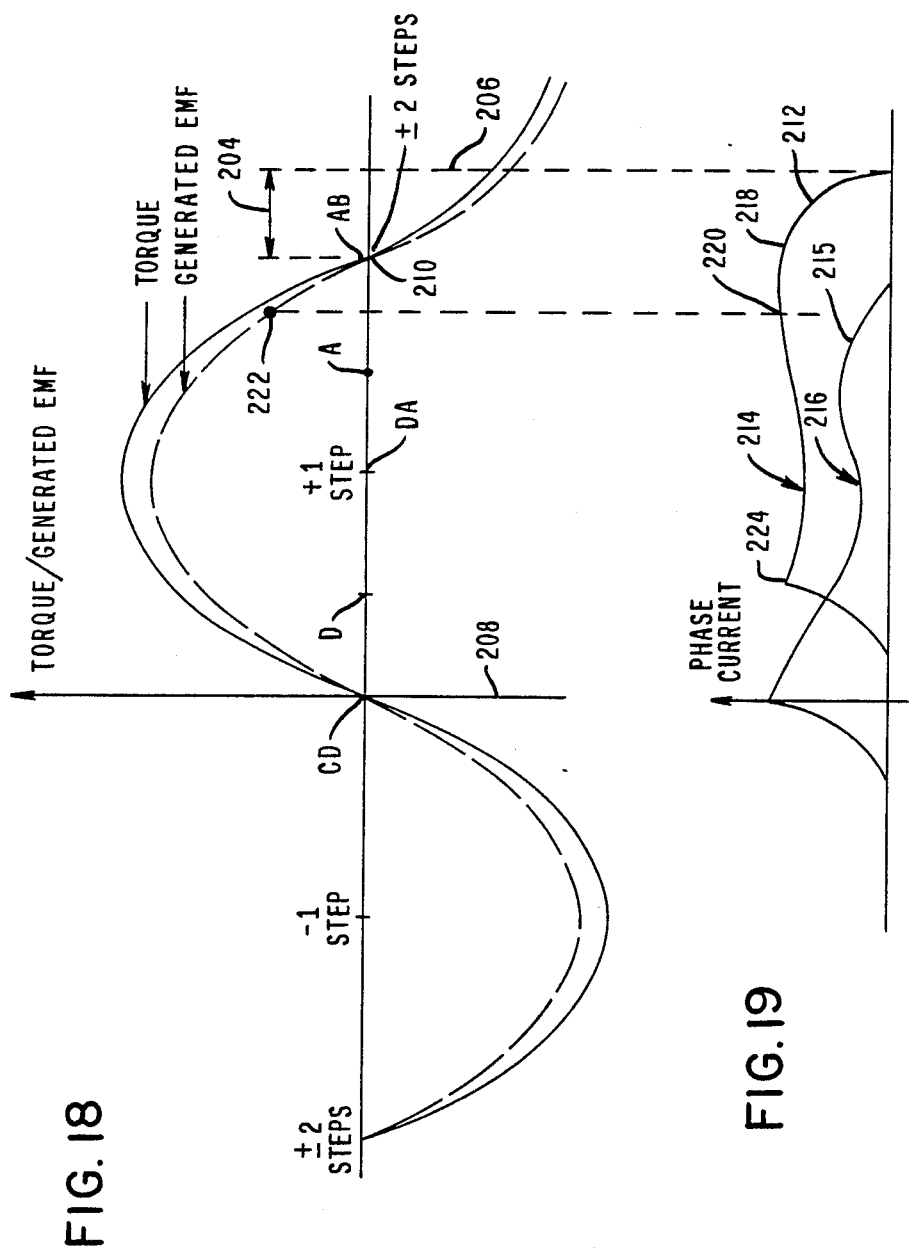
FIG. 18 is a diagram showing torque and generated EMF relationships for the embodiment shown in FIG. 15.
FIG. 19 is a diagram showing current relationships of the first and second embodiment shown in FIGS. 1 and 15.

The advantages of the two and one-quarter step advance for stepping motor 12-1 can be explained best in relation to diagrams which show torque and generated EMF relationships as shown in FIG. 18. Assume that the stepping motor 12-1 has accelerated through the "Start" mode and is in the "Run" mode which is shown in FIG. 18. One and two step lead angles are shown along the horizontal axis, and torque and generated or back EMF are shown along the vertical axis. A one-quarter step lead is shown by double arrow 204 which extends to the right (as reviewed in FIG. 18) from the ±2 step position shown. The dashed line 206 shows the location of an energizing position which represents a two-and-one-quarter step lead angle from the origin shown by line 208; in other words, it represents the point of energization. Notice that from the line 206 in FIG. 18 to the point 210, the generated or back EMF (shown by the dashed line in FIG. 18) actually aids the energizing current. In the embodiment described the normal driving voltage is 28 volts; however, due to the back EMF generated between line 206 and point 210, the actual driving voltage is about 40 to 50 volts. This higher driving voltage causes a very rapid rise in current as shown by the knee portion 212 of curve 214 shown in FIG. 19.

FIG. 19 shows the current curve 214 for the second embodiment of the stepping motor 12-1 and the current curve 216 for the stepping motor 12. These two curves 214 and 216 were placed under the torque and back EMF curves of FIG. 18 to show the relationships thereto. While the current rises quickly in the knee position 212, it is kept from going any higher at the area 218 by the regulating action of the current control 162 in FIG. 11. In this regard, it should be recalled that the voltage is monitored at register 172 (via conductor 187) to modulate the "on" period for the chopping transistor 166 to thereby control the current level through the stator windings, like A-1 through A-4, for example. The current level is kept relatively constant between point 218 on the curve 214 until about point 220 thereon, and thereafter, the current begins to fall. This is due to the back EMF starting to rise rapidly in the stator windings as shown by point 222 in FIG. 18. FIG. 19 has been aligned under FIG. 18 to show this relationship. The current starts to rise again, reaching a peak at point 224 of curve 214 due to the back EMF starting to fall. From point 224 there is a cut off of driving voltage and the current level falls quickly.

The curve 216 (FIG. 19) for the stepping motor 12 is shown along with the curve 214 for the stepping motor 12-1 to show the relationship between the two. While the stepping motor 12 represents an improvement over prior art stepping motors, the stepping motor 12-1 with the two-and-one-quarter step lead angle represents an improvement over the stepping motor 12. Proceeding from right to left in FIG. 19, notice that the current rises very quickly at the knee portion 212 of curve 214 compared to the rise in the knee portion 215 in curve 216 as previously explained. Notice also that the level of current in the curve 214 is higher than it is for the curve 216 for substantially all of a cycle. This means that the energizing torque is higher in stepping motor 12-1 than it is in stepping motor 12. There is a slight disadvantage in stepping motor 12-1 in that a negative torque is produced in its associated torque curve shown in FIG. 18; this negative torque area occurs between double arrows 204 in FIG. 18. However, this negative torque factor is more than offset by having the stepping motor 12-1 operate at a high current level for a longer period of time than does the stepping motor 12 as already discussed in relation to curves 214 and 216, respectively (FIG. 19).

Because there is negative torque in the area between the double arrow 204 of the torque curve in FIG. 18, it means that the rotor would turn in a direction opposite to that intended at start up. To overcome this problem, there is a "Start" mode or routine which is used as discussed earlier in relation to FIG. 10; it should be recalled that the discussion relative to FIG. 18 related to the "Run" mode of operation. Essentially, the "Start" mode does not have any unusual lead angles, and it is used to get the stepping motors 12 and 12-1 up to a certain stepping rate, like 1,000 to 1,500 steps per second, before these motors are operated in the "Run" mode.

Figure 17:
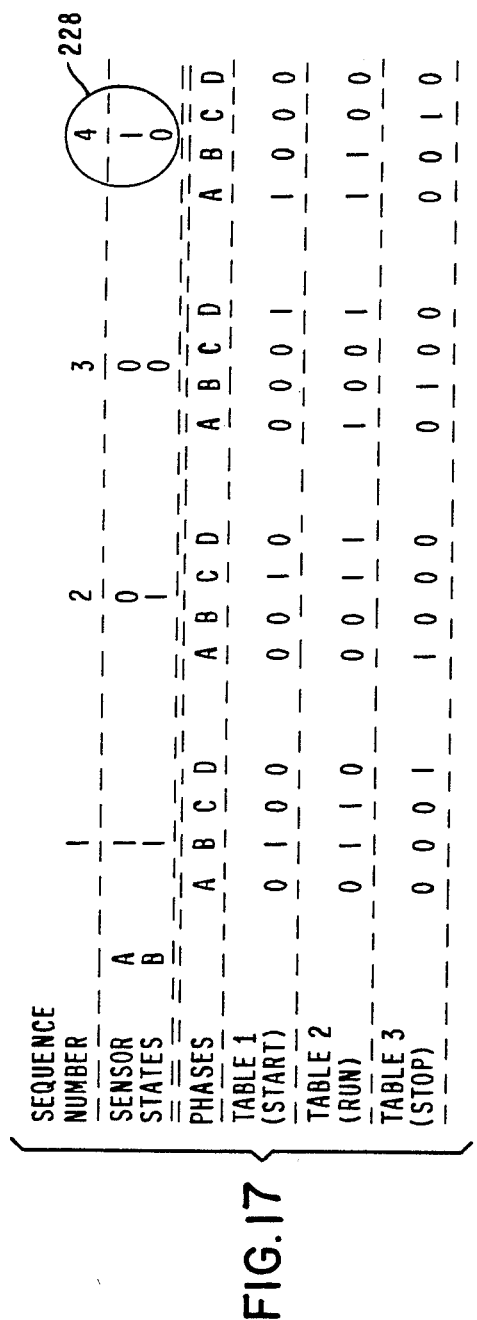
FIG. 17 is a chart showing the relationship of sensor states and phases used with the stepping motors shown in FIGS. 1 and 15.

For the "Start" mode, assume the rotor 18 is physically located at the CD position. The various rotor positions for the stepping motor 12-1 are shown in FIG. 16 and a Position of them is shown along the horizontal axis in FIG. 18. From the chart in FIG. 16, the state for sensor A is a binary "1" and the state for sensor B is a binary "0" for the CD position; these two states are encircled in circle 226 to facilitate finding them. Notice that the rotor position has passed the transition point (represented by dashed line 200) when viewing sensor states with respect to the direction of forward motion shown in FIG. 16. Because the motor 12-1 is in the "Start" mode as described, the controller 54 (FIG. 3) determines from the sensor states "1" and "0" for sensors A and B that the mOtor 12-1 is in sequence #4 which is encircled by circle 228 in FIG. 17. From the horizontal line entitled Table #1 (for the "Start" mode) a one (1) is shown under the column mark A for the phase A, B, C and D . From this rotor position, the controller 57 energizes phase "A" to get the rotor 18 moving. As the rotor 18 rotates, the next transition point which occurs in tne example described occurs at dashed line 202 in FIG. 6, after which sensors A and B become binary "1's." Sensor states of "1" and "1", as shown in FIG. 17, indicate that the motor 12-1 is in sequence #1. The controller 57 uses Table #1 for the "Start" mode and finds that a "1" exists under phase B (for sequence #1) which means that phase B is initiated or stator windings B-1 through B-4 are energized. This process continues until the speed of the rotor 18 of the stepping motor 12-1 reaches a stepping rate of 1,000 to 1,500 steps per second. In this regard, the elapsed time between steps is used as a measure of stepping velocity, as previously discussed in relation to FIGS. 9A, 9B and 10. After the just-named stepping rate is achieved, the controller 57 shifts the motor 12-1 into the "Run" mode.

Assume that the rotor 18 of stepping motor 12-1 is in the position represented by CD in FIG. 16. With the A and B sensor states being "1" and "0" as referenced by circle 226, the controller 57 determines that the motor 12-1 is again in sequence #4 as shown in circle 228 in FIG. 7. However, because the motor 12-1 is in the "Run" mode, the controller 57 utilizes Table 2 in FIG. 17 which indicates that phases A and B are to be energized. Notice from FIG. 18, that when the position of the rotor 18 is at CD which is marked thereon, energizing phases A and B places the energization at a lead angle of two and one quarter steps. After the rotor 18 passes the position shown by dashed line 202 in FIG. 16, the sensors A and B will indicate (from FIG. 16) that sequence #1 is at hand (FIG. 17). From FIG. 17 and Table 2 therein, the phases B and C will be energized. This process continues until a "Stop" command is received. When a "Stop" command is received, Table #3 of FIG. 17 is utilized along with the routine already discussed in relation to FIGS. 9A, 9B and 10.

The chart shown in FIG. 17 is used also for the stepping motor 12. As previously stated, the two-and-one-quarter step lead angle is effected by repositioning the sensors 24-1 and 26-1 for motor 12-1; otherwise the motors 12 and 12-1 are essentially the same.

What is claimed is:

1. A control system for a stepping motor operable in start, run, and stop modes of operation and having windings and a rotor moveable in rotation through a plurality of stable positions, said control system comprising:

means for indicating the position of said rotor including first and second detectors having first and second outputs, respectively; and a controller means for receiving said first and second outputs of said first and second detectors and for energizing said windings in said start, run, and stop modes of operation;

said controller means including means for determining the stepping velocity of said rotor; and said controller means utilizing the first and second outputs of said first and second detectors to engergize said windings with at least a two step lead angle in said run mode of operation when said stepping velocity reaches a predetermined rate;

said controller means comprising;

mans for generating an interrupt signal from said first and second outputs, means for determining which of said start, run, or stop modes of operation said stepping motor is bieng operated in whenever a said interrupt signal occurs;

start, run, and stop tables; each said start, run, and stop table having a plurality of phases denting which of said windings are to be energized and not energized for the various combinations of the first and second outputs from said first and second detectors;

means for seleting the phase in said start, run, and stop tables to be utilized in energizing said windings; and means for energizing said windings in response to said phase selected.

2. The control system as claimed in claim 1 in which said first and second detectors are positioned relative to said motor to effect said lead angle which is two steps in said run mode of operation.

3. The control system as claimed in claim 1 in which said first and second detectors are postioned relative to said motor to effect said lead angle which is two and one quarter steps in said run mode of operation.

4. The control system as claimed in claim 3 in which said indicating means includes a disc fixed to said rotor to rotate therewith, said disc having radial slits therein to coact with said first and second detectors.

5. A combination comprising:
a stepping motor having windings and a rotor moveable through a plurality of stable positions, and
a control system for controlling the operation of said stepping motor in start, run, and stop modes of operation;
said control system comprising;
means for indicating the position of said rotor including first and second detectors having first and second outputs respectiely; and
a controller means for receiving said first and second outputs of said first and second detectors and for energizing said windings in said start, run, and stop modes of operation;
said controller means including means for determining the stepping velocity of said rotor; and
said controller means utilizing the first and second outputs of said first and second detectors to energize said windings with at least a two step lead angle in said run mode of operation withnsaid stepping velocity reaches a predetermined rate;
said controller means also comprising:
means for generating an interrupt signal from said first and second outputs;
means for determining which of said start, run, or stop modes of operation said stepping motor is being operated in whenever a said interrupt signal occurs;
start, run, and stop tables; each said start, run, and stop table having a plurality of phases denoting which of said windings are to be energized and not energized for the various combinations of the first and second outputs from said first and secon detectors;
means for selecting the phase in said start, run, and stop tables to be utilized in energizing said windings in response to said phase selected.

6. The control system as claimed in claim 5 in which said first and second detectors are positioned relative to said motor to effect said lead angle which is two steps in said run mode of operation.

7. The control system as claimed in claim 5 in which said first and second detectors are positioned relative to said motor to effect said lead angle which is two and one quarter steps in said run mode of operation.

8. A method of controlling a stepping motor comprising the steps:
  (a) detecting the position of the rotor of said stepping motor by examining first and second outputs from first and second detectors respectively, associated with the rotor for use in start, run, and stop modes of operation;
  (b) generating an interrupt signal from said first and second outputs;
  (c) determining the stepping velocity of said rotor;
  (d) determining whether said stepping motor is in start, run, or stop modes of operation when a said interrupt signal occurs;
  (e) utilizing start, run, and stop tables having a plurality of phases donating which of the windings in the stepping motor are to be energized and not energized for various combinations of said first and second outputs;
  (f) selecting the phase in said start, run, and stop tables to be used in energizing said windings; and
  (g) utilizing the outputs of the first and second detectors and energizing the windings of said stepping motor with at least a two-step lead angle in said run mode of operation when said stepping velocity reaches a predetermined rate.

9. The method as claimed in claim 8 which said energizing step is effected to produce a two and one quarter step lead angle in said run mode of operation.

* * * * *

UNITED STATES PATENT AND TRADEMARK OFFICE
CERTIFICATE OF CORRECTION

PATENT NO. : 4,710,690

DATED : December 1, 1987

INVENTOR(S) : Bruce A. Reid et al.

It is certified that error appears in the above—identified patent and that said Letters Patent is hereby corrected as shown below:

```
Column 14, line 40, delete "mans" and substitute
          --means--.

Column 14, line 44, delete "bieng" and substitute
          --being--.

Column 14, line 52, delete "seleting" and substitute
          --selecting--.

Column 15, line 20, delete "withnsaid" and substitute
          --when said--.

Column 15, line 33, delete "secon" and substitute
          --second--.
```

Signed and Sealed this

Third Day of May, 1988

Attest:

DONALD J. QUIGG

Attesting Officer

Commissioner of Patents and Trademarks